June 18, 1940. R. B. PARKER 2,204,945
MILLING MACHINE
Filed Aug. 31, 1937 7 Sheets-Sheet 1

Inventor:
Robert B. Parker.
by Amis A. Maxson.
Atty.

June 18, 1940.  R. B. PARKER  2,204,945
MILLING MACHINE
Filed Aug. 31, 1937  7 Sheets-Sheet 2

Inventor:
Robert B. Parker
by Louis A. Maxson
Atty.

June 18, 1940.  R. B. PARKER  2,204,945
MILLING MACHINE
Filed Aug. 31, 1937    7 Sheets-Sheet 4

Inventor:
Robert B. Parker.
by Louis A. Maxson.
Atty.

Inventor:
Robert B. Parker.

June 18, 1940.   R. B. PARKER   2,204,945
MILLING MACHINE
Filed Aug. 31, 1937   7 Sheets-Sheet 7

Inventor:
Robert B. Parker.
By Louis A. Maxson
Atty.

Patented June 18, 1940

2,204,945

UNITED STATES PATENT OFFICE 2,204,945

MILLING MACHINE

Robert B. Parker, Claremont, N. H., assignor to Sullivan Machinery Company, a corporation of Massachusetts Application August 31, 1937, Serial No. 161,823

27 Claims. (Cl. 90—11)

This invention relates to milling machines, and more particularly, but not exclusively, to improvements in a "hot milling machine" especially designed to operate on an appropriately heated rock drill bit, for forming or sharpening the cutting surfaces of the bit.

An object of this invention is to provide an improved milling machine, whereby the work may be quickly formed with a minimum amount of manipulation, and, resultantly, the cost of forming the work may be maintained extremely low. Another object is to provide an improved "hot milling machine" especially designed to operate on an appropriately heated rock drill bit, whereby the cutting face and sides of the cutting portion of the bit may be readily and quickly formed in an improved manner. A further object is to provide an improved milling machine especially designed to use in forming or sharpening rock drill bits and having improved means for positioning and supporting the drill bit and for guiding the drill bit with respect to the milling cutters during the forming or sharpening operation. Yet another object is to provide an improved milling machine having a pair of milling cutters driven at a relatively high speed, and improved means for guiding and positioning the drill bit relative to the cutters for forming the cutting face and cutting sides of the cutting portion of the bit, the bit supporting means being adjustable to locate the bit in different positions with respect to the different cutters so that the bit may be formed in an improved manner. Still another object is to provide an improved supporting and guiding structure for the bit support, whereby the bit is maintained in a vertical position during forming of the bit face, and adjustable to locate the bit in a horizontal position during forming of the sides of the cutting portion of the bit. A still further object is to provide a novel bit securing means for attaching the bit to the bit holder barrel, together with improved means for supporting the barrel with respect to the milling cutters. A still further object is to provide an improved means for locking the barrel against rotation with respect to the holder support during the forming of the bit face and for releasing the barrel for free rotation with respect to the holder support during forming of the sides of the bit. These and other objects and advantages of the invention will, however, hereinafter more fully appear.

In the accompanying drawings there are shown for purposes of illustration three forms which the invention may assume in practice.

In these drawings.

In the preferred illustrative embodiment of the invention disclosed in Figs. 1 to 14, inclusive, there is shown a milling machine of the type known as a "hot milling machine" especially designed for forming the cutting portion of an appropriately heated rock drill bit, such as a detachable rock drill bit of a character similar to that disclosed in Figs. 1 to 5, inclusive, of the patent to Paul H. Nast, granted Aug. 1, 1939, No. 2,168,102. It will be evident, however, that the improved milling machine may be employed in general milling work.

Figure 7:
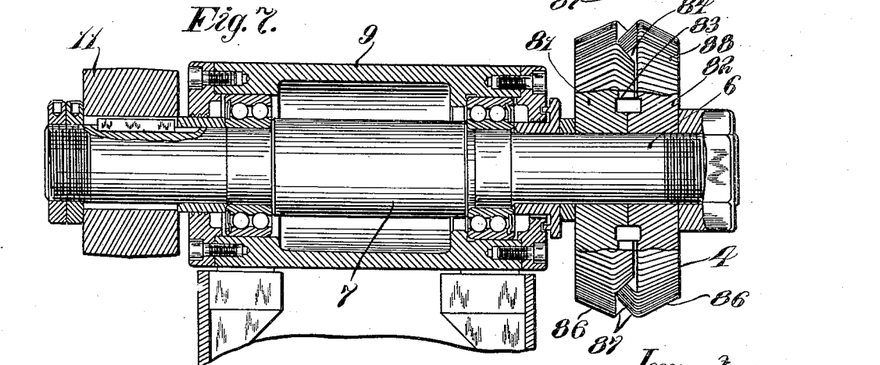
Fig. 7 is a detail sectional view taken substantially on line 7—7 of Fig. 4, showing the spindle and bearing structure for the face forming cutter.
Figures 9, 10, 11, 12:
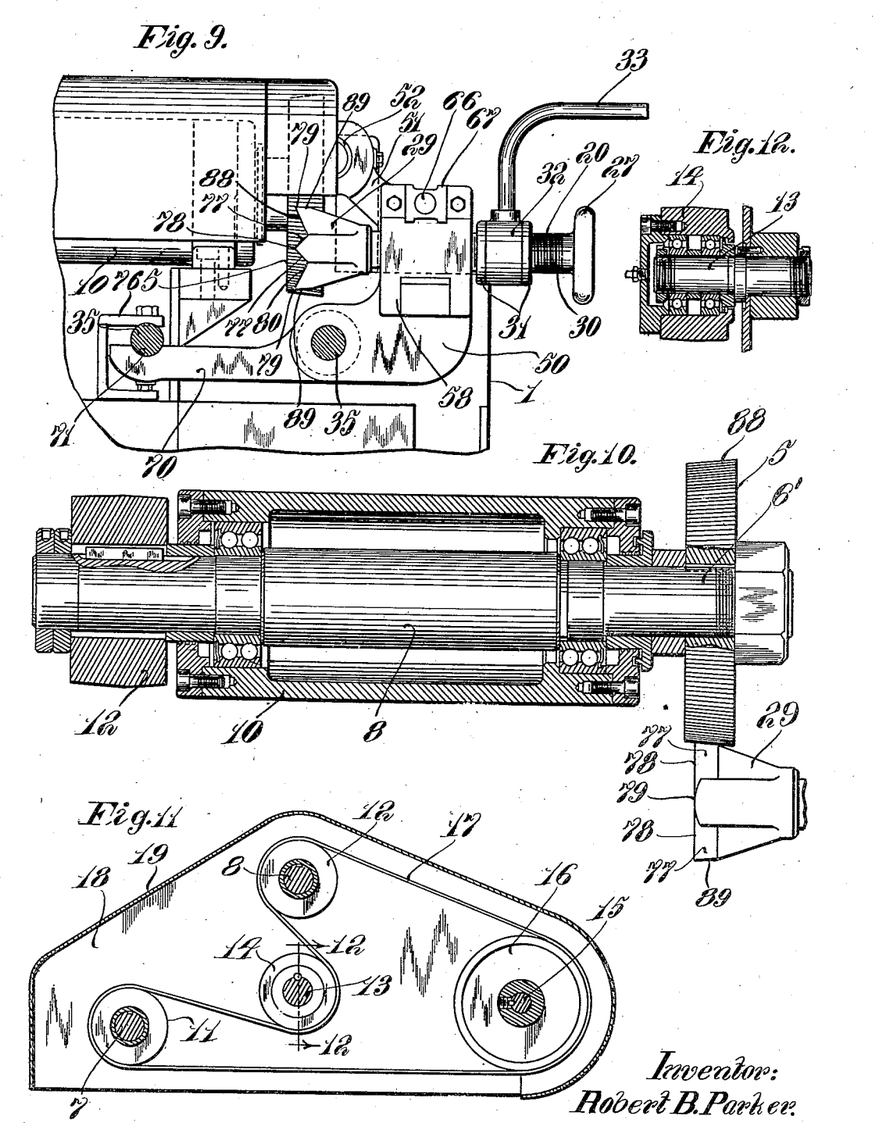
Fig. 9 is a view, with parts shown in section, showing the bit in operative position with respect to the side forming cutter and with the latter shown in elevation.
Fig. 10 is an enlarged detail sectional view taken substantially on line 10—10 of Fig. 4, showing the spindle and bearing structure for the side cutter.
Fig. 11 is a view in longitudinal section taken substantially on line 11—11 of Fig. 3.
Fig. 12 is a detail sectional view taken substantially on line 12—12 of Fig. 11.
Figure 13:
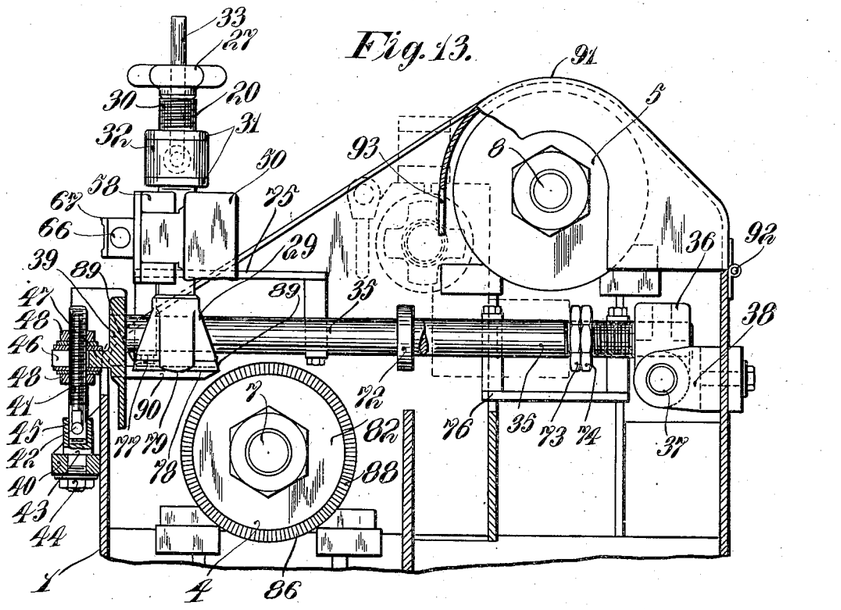
Fig. 13 is a longitudinally extending vertical sectional view, with parts shown in side elevation, taken substantially on line 13—13 of Figs. 1 and 3.
Figure 14:
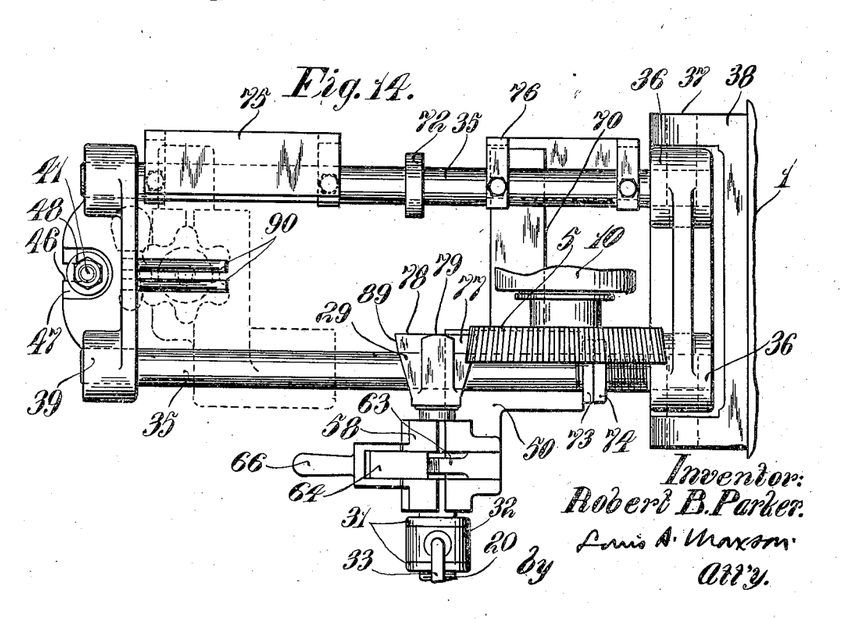
Fig. 14 is a detail plan view illustrating the bit supporting and guiding structure shown in Fig. 13, with parts omitted to facilitate illustration.

The improved milling machine, in this instance, comprises a base frame 1 having secured thereto, at one side thereof, a shelf-like bracket 2 on which is supported a motor 3. Journaled within the upper portion of the base frame on parallel axes extending transversely of the frame in parallelism with the axis of the motor power shaft, are milling cutters 4 and 5, hereinafter known as face and side cutters respectively. As shown in Figs. 7 and 10, respectively, the milling cutters 4 and 5 are secured to the projecting ends 6 and 6' of horizontal spindles 7 and 8 respectively journaled within ball bearings supported within bearing brackets 9 and 10 suitably secured to the upper part of the base frame. Keyed to the other ends of the spindles are pulleys 11 and 12, respectively, while journaled on ball bearings supported by a stub shaft 13 secured to the frame, is an idler pulley 14 arranged with its axis parallel with the axes of the pulleys 11 and 12. Keyed to the power shaft 15 of the motor 3 is a driving pulley 16, and engaging the pulleys 16, 12, 14 and 11 is an endless driving belt 17. The driving belt and pulleys are housed within a chamber 18 formed by a housing 19 secured to the frame.

The holder barrel for the bit comprises a tubular barrel member 20 of cylindrical form having a slotted end providing resilient jaws 21 formed with inwardly inclined surfaces 22 engaging the exterior surface of a jaw-expanding wedge 23. Suitable means, preferably a pin or lug 24, fixed to the wedge and projecting in a slot between a pair of jaws prevents rotation of the wedge relative to the barrel, while permitting axial wedge movement. Extending centrally within the barrel member 20 is an operating rod 25 threaded at 26 within the jaw-expanding wedge and provided at its outer end with an operating handle 27. The jaws 21 are receivable within a socket 28 of the drill bit, generally designated 29, and when the operating rod 25 is rotated by the handle 27, inward axial movement of the wedge relative to the bit is effected, due to the threaded engagement between the rod and wedge, thereby spreading the jaws 21 apart and causing the same to grip the drill bit to hold securely the bit in forming position on the holder. The barrel member is threaded at 30, and arranged between collars 31, 31 adjustably threaded thereon is a member 32 having a handle portion 33 adapted to be grasped by the operator, whereby the barrel may be rotated, for a purpose to be later explained.

Now referring to the bit supporting and guiding structure for guiding the bit with respect to the milling cutters during the forming or sharpening operation, it will be noted that arranged in longitudinal parallel relation at the opposite sides of the face milling cutter 4 are cylindric guide rods 35, 35, and the inner ends of these guide rods are fixed within a transverse frame 36 pivotally mounted at 37 on a bracket 38 fixed to the base frame, whereby the guide rods may be adjusted in vertical planes. The outer ends of the guide rods 35, 35 are fixed within a transverse frame 39, and means is provided between this frame and a bracket 40, secured to the base frame, for adjusting the guide rods in vertical planes about the pivot 37. This adjusting means comprises a screw 41 pivoted on a transverse axis at 42 to a support member 43 in turn secured by a nut 44 to the bracket 40. The member 43 is longitudinally slotted at 45 to permit swinging of the screw 41 in longitudinal planes about its pivot. This screw is receivable within a slot 46 formed within a projection 47 integral with the frame 39, and threaded on the screw and engaging the opposite sides of the slotted projection are nuts 48 for adjusting the frame 39 and guide rods 35, 35 in a vertical direction about the pivot 37. This adjustment of the guiding structure enables adjustment of the bit-holding structure with respect to the face milling cutter 4. Mounted on the guide rods 35, 35 for sliding movement longitudinally therealong and pivotally mounted at 49 for swinging movement about the longitudinal axis of one of the guide rods is a work holder supporting frame 50 having an integral arm 51 provided near its extremity with a concave guiding surface 52 engaging the upper surface of the other guide rod 35 to aid in guiding of the frame along the rods. Formed on this frame 50 is a socket 53 receiving a block 54 held within the socket by a screw 55, and this block has a V-shaped seat 56. Pivoted at 57 on a projecting lug integral with the frame is a clamp member 58 formed with a socket 59. Seated within this socket is a semi-circular bushing 60 held within the socket by a screw 61. Pivotally mounted at 62 on a slotted projection integral with the frame is an eye-bolt 63 having threaded thereon an adjusting nut 64. Pivotally mounted at 65 on this nut is an operating lever 66 formed with a cam surface 67. As clearly shown in Figs. 5 and 6, the work holding barrel 20 is receivable within the seat 56 of the block 54, and when the clamp 58 is in the closed position shown in Fig. 6, the bushing 60 engages the outer surface of the tubular member 20, and when the lever 66 is swung about its pivot, the cam effects tightening of the eye-bolt 63 to clamp the barrel in position on the sliding frame 50. When the parts are in the position shown in Fig. 6 and the cam 67 is released to relieve the clamping pressure on the barrel, the latter may be rotated on its seat within the clamp, as will later be described. Threaded within the frame 39, at 68, is a stop member 69 having an adjusting nut 70, and the frame 50 is engageable with this stop member when in its outermost position on the guide rods, in the manner shown in Fig. 6, the stop member limiting outward movement of the sliding frame along the guide rods. Formed integral with the sliding frame 50 in substantially right angle relation with respect to the arm 51, is an arm 70 having a concave guiding surface 71, and when the frame 50 is swung about its pivotal mounting on the guide rod from the position shown in Fig. 5 to the position shown in Fig. 9, the arm 70 underlies the other guide rod with the guiding surface 71 engaging the lower surface of the rod. When the frame 50 is in the position shown in Fig. 5 with the holder barrel vertically disposed, sliding movement of the frame inwardly along the guide rods is limited by an abutment in the form of a stop collar 72 fixed to the one of the rods 35 which does not extend through the frame 50, and when the frame reaches this inward limit of sliding movement, it may be swung about its pivotal mounting on the other rod, and, due to the off-set arrangement of the arm 70, the guiding surface on the arm will then engage the lower surface of the rod at the inner side of the abutment 72, so that when the frame is in the position shown in Fig. 9, further inward sliding movement of the frame along the rods is possible. When the frame is in the position shown in Fig. 9, with the holder barrel horizontally disposed, sliding movement of the frame along the rods is limited by an abutment collar 73 adjustably threaded on the rod. The collar 73 is provided with a lock nut 74. For preventing swinging movement of the sliding frame about its pivot relative to the guide rods during the milling operations, there are provided guide plates 75 and 76 secured to the top and bottom respectively of the guide rod 35 which does not extend through the frame 50, so that when one or the other of the frame arms 51, 70 is slid between the guide plate with which it cooperates and the rod 35, swinging of the frame is prevented.

Figure 1:
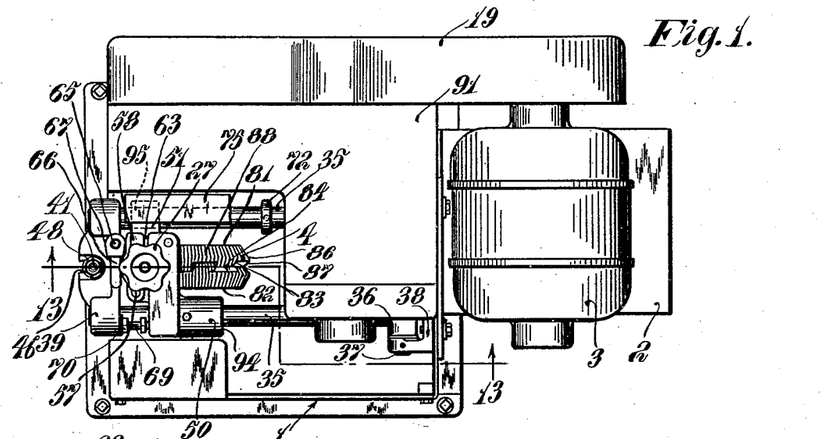
Fig. 1 is a top plan view of the preferred illustrative form of the improved milling machine.
Figure 2:
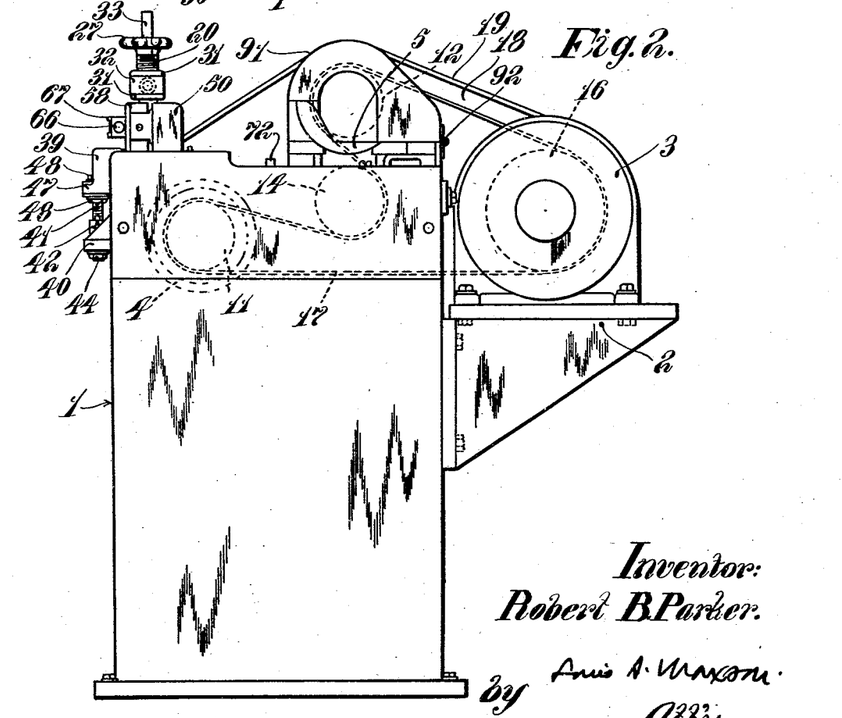
Fig. 2 is a side elevational view of the milling machine shown in Fig. 1.
Figure 3:
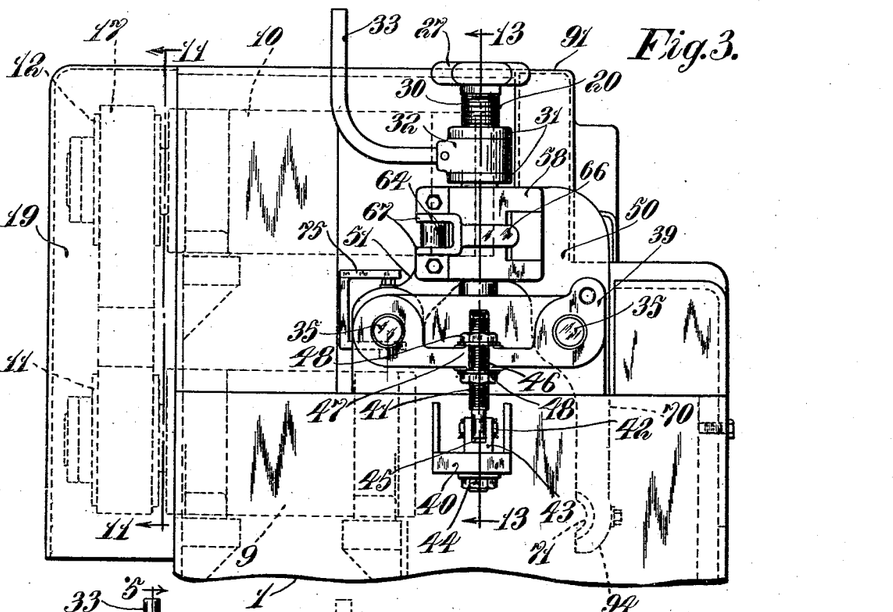
Fig. 3 is an enlarged fragmentary front end elevational view showing the improved supporting and guiding structure for the bit holder barrel.
Figure 4:
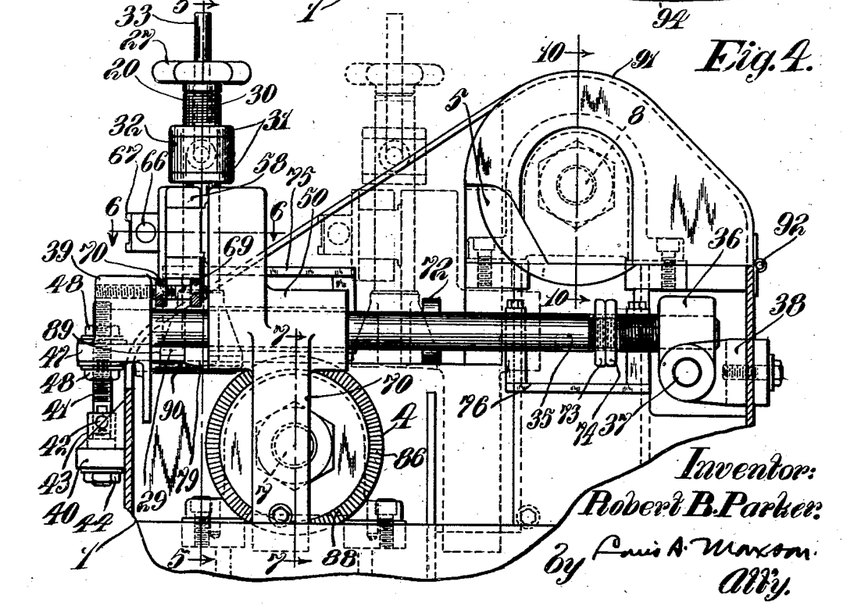
Fig. 4 is a side elevational view of the structure shown in Fig. 3.
Figures 5, 6, 8:
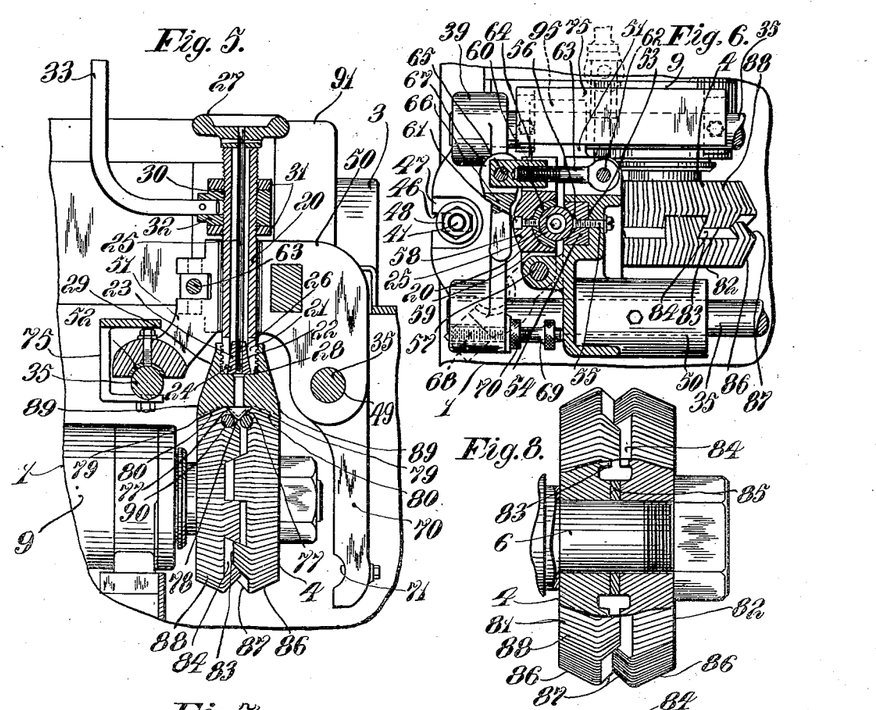
Fig. 5 is a vertical sectional view taken substantially on line 5—5 of Fig. 4.
Fig. 6 is a horizontal sectional view taken substantially on line 6—6 of Fig. 4.
Fig. 8 is a detail view showing the means for relatively adjusting the cooperating parts of the face milling cutter.

Now referring to the particular structure of the drill bit and the milling cutter shapes, it will be noted that formed on the cutting face of the bit are wedge-shaped portions bounded by converging plane surfaces 77, 77 intersecting along diametrically alined cutting edges 78, 78; and arranged diametrically at the opposite sides of the alined cutting edges near the outer projections of the bit are chopping edges 79, 79 at the outer extremities of inclined plane surfaces 80. The lateral surfaces of the cutting edges and the surfaces 80, in this instance, lie in the sides of dihedral angles, and the surfaces intersect along lines parallel with the cutting edges. The specific bit structure does not per se enter into this invention and is clearly described in the Nast patent mentioned above, and therefore a more detailed description thereof is unnecessary. As clearly shown in Fig. 7, the face milling cutter 4 comprises cooperating parts 81 and 82, each having on its inner surface projections 83 projecting within sockets 84, so that the two milling parts are interlocked against relative rotation, but free for relative axial adjustment. As shown in Fig. 8, when it is desired relatively axially to adjust the cutter parts, washers 85 of different thickness may be interposed between the cutter parts, in the manner shown. The cooperating cutter parts are formed with relatively inclined cutting surfaces 86, 87, one of less angle than the other, and shaped to conform to the shape of the plane cutting surfaces on the face of the bit. From the foregoing it will be evident that the surfaces on the bit extend in parallelism across the bit face, and therefore it is necessary to move the bit in a rectilinear path tangentially with respect to the face cutter 4, so that these parallel bit surfaces are appropriately formed. The side cutter 5 is formed with tapered teeth 88 shaped to conform to the inclined side surfaces 89 of the bit, so that when the barrel and bit are brought into the horizontal position shown in Fig. 9, and the bit holder barrel is rotated, the side surfaces of the cutting portion of the bit are appropriately formed.

Improved means is provided for definitely and accurately locating the drill bit relative to the face cutter 4, so that when the barrel is inserted within the sliding frame, the bit is definitely located in position on the frame. This bit-locating, or so-called bit-gauging means, comprises parallel gauge pins 90, 90 fixed to the frame 39 and arranged parallel to the axes of the guide rods 35; and when the holder barrel is inserted within the sliding frame 50, the bit is dropped in position with its inclined surfaces 77, 77 engaging the gauge pins, thereby insuring proper positioning of the cutting face with respect to the surfaces of the face cutter. When the bit is properly positioned, the clamp is completely closed to lock the holder barrel rigidly to the sliding frame, and when the sliding frame is slid inwardly along the guide rods, the bit slides off from the gauge pins 90, 90 into contact with the cutting surfaces of the face cutter.

To prevent flying of the cuttings during the forming or sharpening operations, suitable housing means may be provided for the cutters, and in this instance, the side cutter 5 is provided with a cover 91 pivoted at 92 so that the cover may be swung outwardly away from the milling cutters. This cover is cut away at 93 to enable lateral movement of the bit into engagement with the side cutter. When it is desired to form or sharpen drill bits of different sizes, the screw and nut means 41, 48 may be adjusted to vary the angular relation of the guiding structure about its pivot 37 relative to the face cutter 4, and the stop collar 73 may be adjusted relative to the guide rod to vary the range of movement of the sliding frame 50 relative to the side cutter 5. Also, if desired, milling cutters of different diameters may be substituted for those disclosed, and the guide structure and stop collar adjusted to compensate for the variations in diameter of the cutters.

The mode of operation of the improved milling machine will be clearly apparent from the description given. When the bit to be formed or sharpened is heated to the proper temperature, the jaws 21 of the holder barrel are inserted within the socket in the bit, and the bit locked in position on the barrel by the gripping engagement of the jaws within the bit socket. When the bit is securely locked in position on the holder barrel, the barrel is inserted in position within the seat 56 on the block 54 mounted on the sliding frame 50, and the clamping member 58 is partially but not tightly closed. The barrel is then slid downwardly to bring the surfaces on the bit face into engagement with the parallel gauge pins 90, 90, thereby to locate properly the bit with respect to the cutting surfaces of the face cutter 4, and when the bit is properly located, the lever 66 is swung about its pivot to cause the cam surface 67 to close tightly the clamping member to lock securely the holder barrel to the sliding frame 50. When the bit is properly located in the position shown in Fig. 13 and securely locked to the sliding frame 50, the operator slides the frame 50 inwardly along the parallel guide rods, thereby moving the bit across the cutting surfaces of the face milling cutter, thereby to form the cutting surfaces of the bit. The sliding frame is slid inwardly along the guide rods until the frame abuts the stop collar 72, and the operator then swings the handle 66 to release the holder barrel member 20 for rotation, and manually swings the holder frame 50 about its pivotal mounting on the guide rod 35 to cause the arm 51 to move away from the other guide rod 35 and the right angle arm 70 to move into engagement with the latter guide rod at the opposite inner side of the stop collar. Then the operator shoves the member 20 inwardly until the inner collar 30 engages the outside surface of the holder 50, and while the handle 33 is used to rotate the bit and its holder, the sliding frame 50 may be slid further inwardly along the rods until the frame engages the stop collar 73 with the parts in side forming position adjacent the side cutter 5, as indicated in dotted lines in Fig. 13, and as shown in full lines in Fig. 10. The bit is rotated, with the holder 50 against the stop 73, at least a full turn with respect to the side cutter, thereby to form properly the sides of the bit. Obviously the gauge of the bit may be accurately controlled by the setting of the collars 31. After these milling operations are completed, the clamp 58 is released and the holder barrel removed from the sliding frame and the bit released from the holder barrel by releasing the jaws 21 of the barrel from the bit. As previously mentioned, when it is desired to change the dimensions of the cutting edge supporting surfaces on the bit face, this is possible by inserting washers of different thickness between the inner adjacent surfaces of the axially adjustable face cutter parts. By way of summary, it may be noted that the bit is first given a rectilinear traversing movement with respect to the face cutter 4 and thereafter turned onto its side and given a rotary motion with respect to the side cutter 5. The face of the bit is formed by the first operation, and its gauge and its major peripheral conformation are determined by the second.

Figure 15:
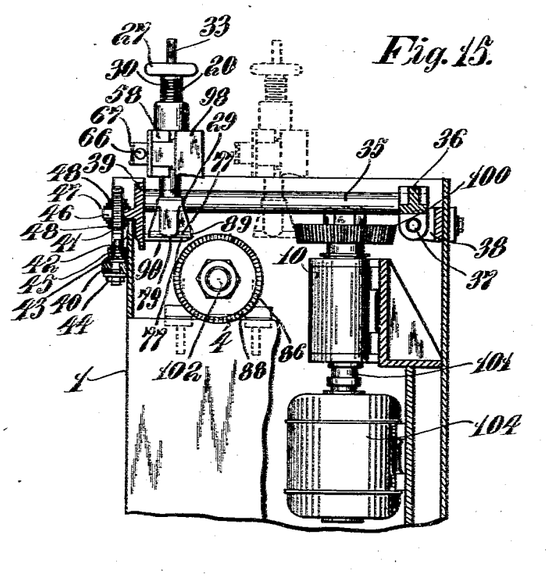
Fig. 15 is a longitudinally extending vertical sectional view, with parts shown in side elevation, illustrating a modified form of construction.
Figure 16:
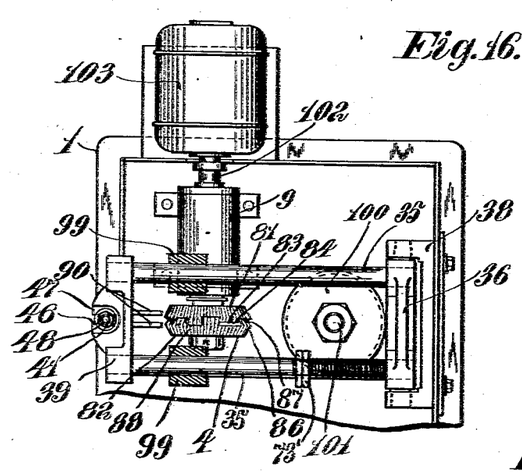
Fig. 16 is a plan view, with parts shown in section, of the construction shown in Fig. 15.
Figures 17, 18, 19, 20:
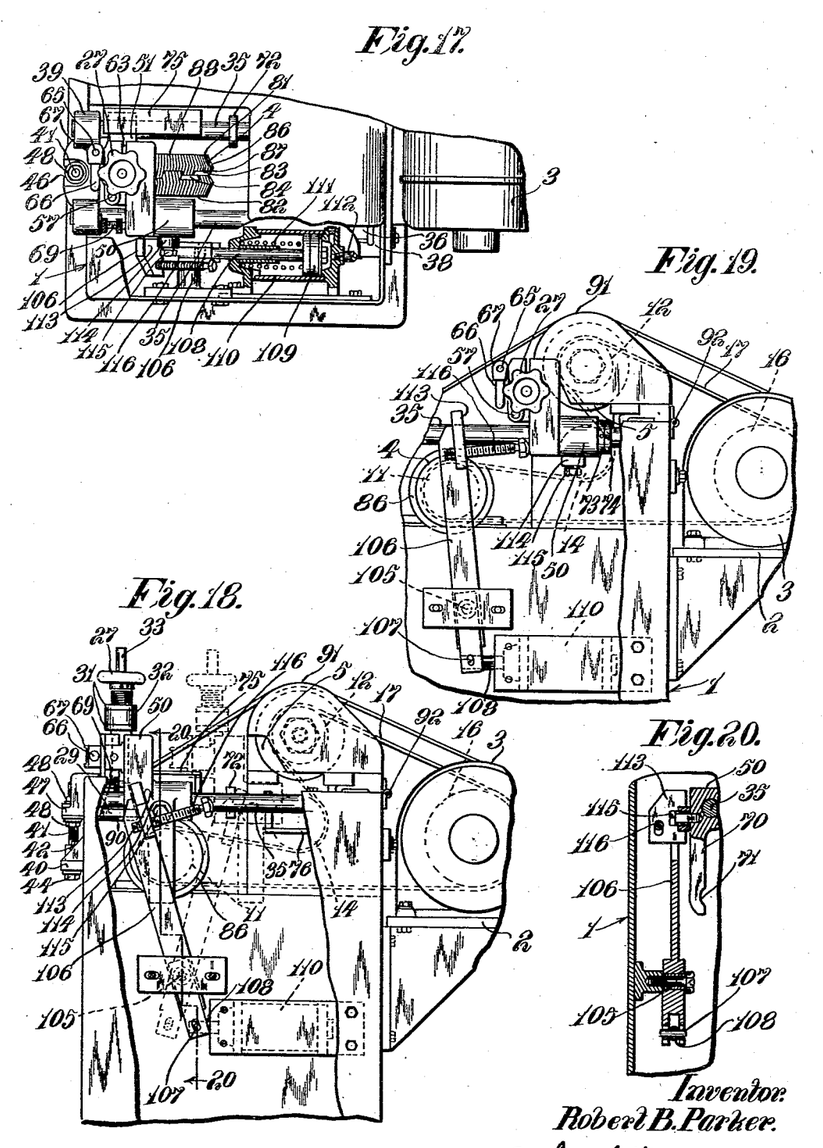
Fig. 17 is a fragmentary plan view, with parts shown in section, illustrating another modified form of construction.
Fig. 18 is a side elevational view of the construction shown in Fig. 17.
Fig. 19 is a fragmentary side elevational view, similar to Fig. 18, showing parts in a different position.
Fig. 20 is a detail sectional view taken substantially on line 20—20 of Fig. 18.

In the modification shown in Figs. 15 and 16, the bit holder and guiding structure are similar to those above disclosed. In this instance, the sliding frame has no swinging movement with respect to the guide rods and the side cutter is arranged to rotate about a vertical axis, so that when the bit traverses the face cutter, it is brought immediately into engagement with the side cutter without swinging of the holder barrel and bit. In this construction, the sliding frame 98 is provided with guide portions 99, 99 slidably mounted on the parallel guide rods 35, 35. The side cutter 100 is, in this instance, arranged with its axis vertical and lying midway between the parallel guide rods, the axis of the side cutter lying in a vertical plane arranged midway between and parallel to the side surfaces of the face cutter 4. Concisely put, a line midway between the pins 90, the central plane of the face cutter 4, and the axis of the side cutter 100, lie in a common vertical plane. In this construction, the belt drive for the side and face cutters is omitted and the spindle 101 of the side cutter and the spindle 102 of the face cutter have respectively connected thereto the power shafts of independent motors 103 and 104. It will be evident, however, that any suitable form of drive for the cutter spindles may be employed, such as a right angle belt drive. The operation of this form of the invention is substantially the same as that above described. When the bit is properly positioned on the gauge pins 90, 90 and the barrel is locked to the frame 98, the latter may be slid inwardly along the guide rods to move the bit from the gauge pins in a rectilinear path across the cutting surfaces of the face cutter, to form the bit face. As in the form of the invention first above described, the barrel holder clamp is then released and the barrel rotated relative to the frame 98, as the bit is moved against the side cutter 100, thereby to rotate the bit with respect to the side cutter to form properly the sides of the bit. A suitable stop 73', similar to the stop collar 73, is provided for the sliding frame 98, so that the bit travel is checked in proper relation with respect to the side cutter. It will be evident that in this form of the invention the necessity of swinging or turning of the frame to bring the holder barrel into a horizontal relation with respect to the side cutter is entirely eliminated, and both the cutting face and sides of the bit are formed by a simple rectilinear movement of the bit—accompanied of course by rotation on its axis during side cutting—with respect to the face and side milling cutters.

In the modification shown in Figs. 17 to 20, inclusive, the milling cutters and work holder frame are the same as those described above in regard to the preferred illustrative embodiment of the invention disclosed in Figs. 1 to 14, inclusive. In this instance, however, power operated means is provided for moving the sliding work holder frame 50 along the guide rods relative to the face cutter 4 and for holding the work in operative relation with respect to the side cutter 5. In this construction, pivotally mounted at 105, at one side of the base frame 1, is a lever 106 connected at its lower end, as by a pin and slot connection 107, to a piston rod 108 of a piston 109 of a conventional servo-motor. This piston 109 is reciprocably mounted in a servo-motor cylinder 110 secured to the base frame. Arranged in the cylinder and acting on the piston 109 is a coil spring 111 constantly urging the piston towards its rearmost released position. Connected to the rear head of the cylinder is a pipe 112 for supplying pressure fluid to the servo-motor cylinder at the rear side of the piston. The upper end of the lever 106 is formed with a plane abutment surface 113 engageable with a roller 114 journaled on a screw 115 secured to the adjacent side of the sliding holder frame 50. The lever 106, at its upper end, carries a set screw 116 arranged in offset relation with respect to the abutment surface 113, and this set screw provides an abutment engageable with the holder frame 50, for a purpose to be later explained. When the sliding holder frame 50 is in the position shown in Fig. 15 with the drill bit supported in its face cutting position, and pressure fluid is supplied through the pipe 112 to the rear end of the cylinder, the piston 109 is moved forwardly within the cylinder to swing the lever 106 about its pivot, and the lever, engaging the roller on the sliding frame, effects movement of the latter along the guide rods, thereby to move the drill bit relative to the face cutter. When the pressure fluid supply to the cylinder is cut off and the cylinder is suitably vented to atmosphere, the coil spring 111 moves the piston 109 into its rearmost released position, and, of course, moves the lever 106 back to the position shown in Fig. 18. When the work holder frame 50 is swung into the position shown in Fig. 19 with the drill bit supported in its side cutting position, the front surface of the frame 50 will assume a position in which it is engageable by the screw 116, and when pressure fluid is again supplied to the servo-motor cylinder to effect movement of the piston, thereby to swing the lever about its pivot, the set screw 116, in the upper end of the lever, engages the sliding frame 50 to move and hold the latter in side cutting position. Otherwise, this form of the invention is the same as that described above in regard to the preferred embodiment of the invention.

As a result of this invention, it will be noted that a novel milling machine is provided especially designed for the forming of the cutting surfaces of a rock drill bit. It will further be noted that by rotating the milling cutters at a relatively high speed and heating the bit to a safe degree above the critical temperature prior to the "hot" milling operation, forming of the cutting surfaces of the bit is greatly facilitated and wear of the cutters is greatly decreased. It will still further be evident that by the provision of rapidly rotating milling cutters, the speed of the forming process is greatly increased over that of a conventional forging machine or grinding wheel. Other uses and advantages of the improved milling machine will be clearly apparent to those skilled in the art.

While there are in this application specifically described three forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a machine of the character described, in combination, relatively rotatable circular forming members, means for rotating said members independently of any movement of the work with respect thereto, and work supporting and guiding means for guiding the work into and supporting it in cooperating forming relation with respect to said forming members, said supporting and guiding means constructed and arranged to preclude the existence of forming relation of the work with more than one of said forming members at a time and serving to support and guide the work during its transition from one forming member to the other.

2. In a machine of the character described, in combination, relatively rotatable circular forming members, means for rotating said members, and work supporting and guiding means for guiding the work into and supporting it in cooperating forming relation with respect to said forming members one at a time including means for changing the angular relation of the work with respect to said forming members during the transition of the work from one forming member to the other.

3. In a machine of the character described, in combination, relatively rotatable circular forming members, means for rotating said members, and work supporting and guiding means for guiding the work into and supporting it in cooperating forming relation with respect to said forming members, said work supporting and guiding means constructed and arranged to preclude the existence of forming relation of the work with more than one of said forming members at a time and serving to support and guide the work during its transition from one forming member to the other, and said supporting and guiding means including means for guiding the work in a rectilinear path with respect to one forming member and for supporting the work for rotation with respect to the other forming member.

4. In a machine of the character described, in combination, relatively rotatable circular forming members, means for rotating said members, and work supporting and guiding means for supporting the work for adjustment into and supporting it in one position with respect to one forming member and for supporting the work for adjustment into a right angle position with respect to the other forming member.

5. In a machine of the character described, in combination, relatively rotatable circular forming members, means for rotating said members, work supporting and guiding means for supporting the work for guided movement in a rectilinear path into and supporting it in cooperating forming relation with respect to said forming members one at a time, the work being movable rectilinearly along said supporting and guiding means during its forming relation with respect to one forming member, and means operative when the work is supported in cooperating forming relation with the other forming member, for rotating the work.

6. In a milling machine, in combination, relatively rotatable face and side milling cutters, means for driving said cutters, work supporting and guiding means for supporting and guiding the work with respect to said cutters, said supporting and guiding means embodying means for locating the work in different positions with respect to said cutters, said supporting and guiding means serving to support and guide the work during its transition from one cutter to the other, and means for rotating the work when the latter is located in forming relation with respect to said side milling cutter.

7. In a milling machine, in combination, relatively rotatable face and side milling cutters, means for driving said cutters, work supporting and guiding means for supporting the work for guided movement during its transition from one cutter to the other, and means for rotating the work when the latter is in cooperating forming relation with respect to one of said cutters.

8. In a milling machine, in combination, relatively rotatable face and side milling cutters arranged on parallel axes, means for driving said cutters, work supporting and guiding means for locating and supporting the work in different positions with respect to said cutters one at a time, and means for rotating the work when the latter is in forming position with respect to one of said cutters.

9. In a milling machine, in combination, relatively rotatable face and side milling cutters, means for driving said cutters, work supporting and guiding means for supporting the work for guided movement during its transition from one cutter to the other, said supporting and guiding means supporting the work in cooperating forming relation with said cutters one at a time, and means for rotating the work when the latter is in forming relation with respect to said side milling cutter.

10. In a milling machine, in combination, relatively rotatable face and side milling cutters, means for driving said cutters, and work supporting and guiding means for supporting the work for guided movement into and supporting it in cooperating forming relation with said cutters singly including means for adjusting the work into different angular relations with respect to said cutters during its transition from one cutter to the other.

11. In a milling machine, in combination, relatively rotatable face and side milling cutters, means for driving said cutters independently of any movement of the work with respect thereto, and work supporting and guiding means for locating and supporting the work in different positions with respect to said cutters including a guideway arranged at right angles to the cutter axes and a work holding frame slidably guided on said guideway, said work holding frame being guided on said guideway and supporting the work for movement along said guideway during the transition of the work from one cutter to the other.

12. In a milling machine, in combination, relatively rotatable face and side milling cutters, means for driving said cutters, and work supporting and guiding means for locating and supporting the work in different positions with respect to said cutters including a guideway arranged at right angles to the cutter axes and a work holding frame slidably guided on said guideway, said frame being swingable relative to said guideway to change the angular relation of the work with respect to said cutters.

13. In a milling machine, in combination, relatively rotatable face and side milling cutters, means for driving said cutters independently of any movement of the work with respect thereto, and work supporting and guiding means for locating and supporting the work in different positions with respect to said cutters including means for supporting the work for rectilinear guided movement with respect to one cutter and for lateral movement with respect to the other cutter.

14. In a milling machine, in combination, relatively rotatable face and side milling cutters, means for driving said cutters independently of any movement of the work with respect thereto, and work supporting and guiding means for locating and supporting the work in different positions with respect to said cutters including means for supporting the work for guided movement in a rectilinear path with respect to one cutter and for adjusting the work into a right angle position with respect to its position when moving in said path to bring it into work relation to said other cutter.

15. In a machine of the character described, in combination, a circular forming member journaled for rotation, means for rotating said member, and guiding structure arranged adjacent to said forming member and mounted to swing about a pivot arranged in parallel relation with the axis of rotation of said forming member, means for adjusting said guiding structure about its pivot relative to said forming member, a supporting frame slidably guided on said guiding structure for supporting the work for guided movement in a rectilinear path with respect to said forming member, and a work holder barrel mounted on said frame for adjustment relative to said guiding structure.

16. In a machine of the character described, in combination, a circular forming member journaled for rotation, means for rotating said member, means providing a guideway adjacent to said forming member, means associated with said guideway-providing means for gauging the work with respect to said forming member, and means slidably guided on the guideway for supporting the work with respect to said gauging means and for guiding the work in a rectilinear path with respect to said forming member.

17. In a milling machine, in combination, relatively rotatable face and side milling cutters disposed on axes arranged in right angular relation, means for driving said cutters independently of any movement of the work with respect thereto, and supporting and guiding means for locating and supporting the work in different positions with respect to said cutters, said supporting and guiding means serving to support and guide the work during its transition from one cutter to the other.

18. In a machine of the character described, in combination, relatively rotatable circular forming members, means for rotating said members independently of any movement of the work with respect thereto, work supporting and guiding means for guiding the work into and supporting it in cooperating forming relation with respect to said forming members one at a time, and power operated means for moving the work along said supporting and guiding means relative to said forming members during the transition of the work from one forming member to the other.

19. In a machine of the character described, in combination, relatively rotatable circular forming members, means for rotating said members, work supporting and guiding means for guiding the work into and supporting it in cooperating forming relation with respect to said forming members one at a time, including means for guiding the work in a rectilinear path with respect to one forming member and for supporting the work for rotation with respect to the other forming member, and power operated means for moving said work supporting means in said rectilinear path with respect to one forming member.

20. In a machine of the character described, in combination, relatively rotatable circular forming members, means for rotating said members, work supporting and guiding means for guiding the work into and supporting it in cooperating forming relation with respect to said forming members one at a time, including means for guiding the work in a rectilinear path with respect to one forming member and supporting the work for rotation with respect to the other forming member, and power operated means for moving said work-supporting means in said rectilinear path with respect to one forming member and for holding the work in operative relation with respect to said other forming member.

21. In a milling machine, a rotatable face milling cutter, a rotatable side milling cutter, a work holder movable into cooperating relation with one or with the other of said cutters, means for guiding said work holder during its transition from one cutter to the other, and means for effecting rotation of the work when the latter is in cooperating forming relation with respect to said side milling cutter.

22. In a milling machine for forming drill bits, in combination, a rotatable face milling cutter, a rotatable side milling cutter, means for driving said cutters, means on which a drill bit is supported for rectilinear movement with respect to said face milling cutter and for rotary movement with respect to said side milling cutter, and means for guiding the bit-supporting means during transition of the bit from one cutter to the other.

23. In a machine of the character described, in combination, relatively rotatable circular forming members, one for forming the face of the work and the other for forming the sides of the work, means for rotating said members, and work supporting and guiding means for guiding the face and sides of the work into and supporting them in cooperating forming relation with respect to said forming members, said supporting and guiding means constructed and arranged to preclude the existence of forming relation of the work with more than one of said forming members at a time and serving to support and guide the work during its transition from one forming member to the other.

24. In a machine of the character described, in combination, relatively rotatable circular forming members, one for forming the face of the work and the other for forming the sides of the work, means for rotating said members, and work supporting and guiding means for guiding the face and sides of the work into and supporting them in cooperating relation with respect to said face and side forming members separately, said supporting and guiding means supporting and guiding the work during its transition from one forming member to the other including means whereby the angular relation of the work may be changed with respect to different forming members during the transition of the work from one forming member to the other.

25. In a milling machine, in combination, relatively rotatable face and side milling cutters, means for driving said cutters, work supporting and guiding means for guiding the work into and for supporting the work in cooperating forming relation with respect to said forming members, said supporting and guiding means constructed and arranged to preclude the existence of forming relation of the work with more than one of said forming members at a time and serving to support and guide the work during its transition from one forming member to the other, and a servo-motor for moving the work along said supporting and guiding means during its transition from one cutter to the other.

26. In a milling machine, in combination, relatively rotatable face and side milling cutters, means for driving said cutters, work supporting and guiding means for guiding the work into and for supporting the work in cooperating forming relation with respect to said forming members, said supporting and guiding means constructed and arranged to preclude the existence of forming relation of the work with more than one of said forming members at a time and serving to support and guide the work during its transition from one forming member to the other, and a servo-motor for moving the work along said supporting and guiding means during its transition from one cutter to the other and for holding the work in operative forming relation with respect to one of said cutters.

27. In a machine of the character described, in combination, a circular forming member journaled for rotation, means for rotating said member, adjustable means providing a guideway adjacent to said forming member, means for adjusting said guideway-providing means relative to said forming member, means associated with said guideway-providing means and relative to which the latter is adjustable for gauging the work with respect to said forming member, and means slidably guided on the guideway for supporting the work with respect to said gauging means and for guiding the work in a rectilinear path with respect to said forming member.

ROBERT B. PARKER.